Feb. 16, 1943. L. A. BANNON ET AL Re. 22,268
SEPARATION OF ISOBUTYLENE FROM HYDROCARBON MIXTURES
Original Filed Nov. 19, 1938
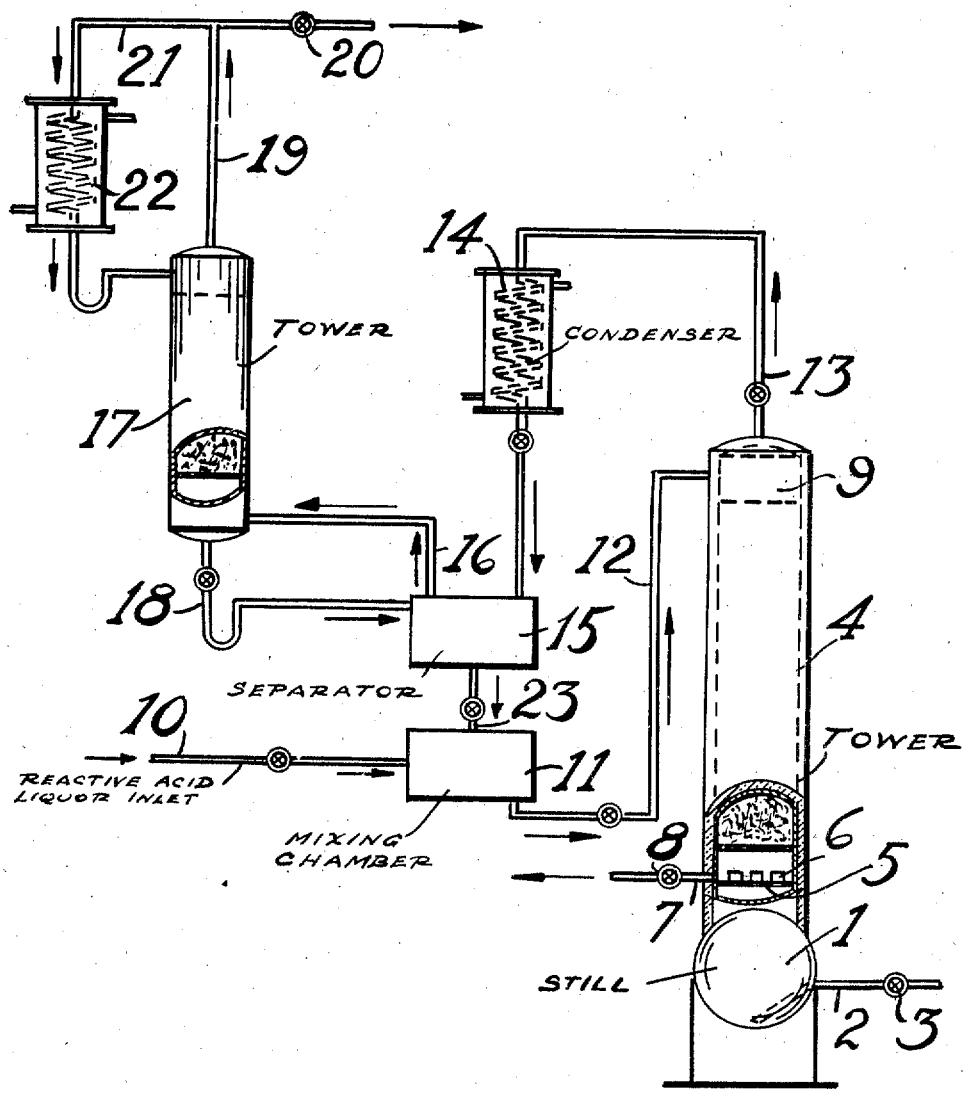
Lewis A. Bannon
Helmuth G. Schneider
Inventors
By P. L. Young
Attorney Reissued Feb. 16, 1943 Re. 22,268

UNITED STATES PATENT OFFICE 22,268

SEPARATION OF ISOBUTYLENE FROM HYDROCARBON MIXTURES

Lewis A. Bannon and Helmuth G. Schneider, Roselle, N. J., assignors to Standard Oil Development Company, a corporation of Delaware Original No. 2,281,911, dated May 5, 1942, Serial No. 241,382, November 19, 1938. Application for reissue August 8, 1942, Serial No. 454,884

3 Claims. (Cl. 260—677)

The present invention relates to the separation of olefins from mixtures of olefins and saturated hydrocarbons which are associated in gaseous and liquid hydrocarbon mixtures, and more particularly it relates to the separation of isobutylene from mixtures of hydrocarbons consisting mainly of olefins and saturated hydrocarbons having 4 carbon atoms to the molecule.

There are many chemical processes in which it is a decided advantage to use a substantially pure olefin, unmixed with inert diluents, such as saturated hydrocarbons. For example, in chemical reactions with the gaseous olefins in which pressure is advantageous, the effective pressure is normally the partial pressure of the reactive olefin in the mixture. In such cases, substantially pure olefins permit much lower pressures to be employed and less gas to be compressed than in the case of a gas mixtures poor in reactive olefin. Also, in many cases the olefin reaction may be reversible, the proportion of the desired product being dependent upon the concentration of reactive olefin in the mixture. In such cases, the dilution of the olefin with an inert diluent, such as a saturated hydrocarbon, may so affect the yield of the desired reaction product as to render the process unprofitable. Also, the desired reaction product may be very volatile, as for example, ethyl chloride and the like, or the chemical reagent used to react with olefin may be very volatile and carried away by the inert diluent.

It is also desirable to have isobutylene free of normal butylenes when the isobutylene is to be polymerized or co-polymerized to high molecular weight resins.

The separation of isobutylene by fractional distillation from the saturated hydrocarbons, other olefins and diolefins having the same number of carbon atoms to the molecule is very difficult, due to the closeness of the boiling points of the various hydrocarbons having 4 carbon atoms to the molecule, which are as follows:

| | Boiling point, °C. |
|---|---|
| Isobutane | −12.2 |
| Isobutylene | −6.8 |
| 1-butylene | −5.0 |
| Butadiene | −2.6 |
| n.Butane | −0.3 |
| 2-butylene, trans | +0.96 |
| 2-butylene, cis | +3.73 |

It has been previously proposed to separate the simple olefins from saturated hydrocarbons by reacting the olefins with various metallic salts with which the olefins form labile combinations and from which the olefin may be regenerated. Certain salts of silver, mercury and copper have been suggested for this purpose, but in commercial practice the use of such salts was found in most cases to be economically unfeasible. Olefins have been extracted from a mixture of saturated and unsaturated hydrocarbons by means of sulfuric acid and the sulfuric acid reaction products thereby prepared utilized in the production of alcohols and other substances. The alcohols were obtained by diluting the sulfuric acid reaction products with water and distilling. It is known that, when sulfuric acid is present in excess or uncombined, it readily polymerizes the olefins when the olefin-sulfuric acid reaction products are heated without sufficient dilution, i. e. polymerization and secondary oxidation reactions occur with the formation of tar or carbon and decomposition of the sulfuric acid to sulfur dioxide and water.

Isobutylene may be readily absorbed by contacting for a few hours the mixture of hydrocarbons containing isobutylene with sulfuric acid of 55% to 75% concentration, preferably from 60% to 70%. When normal or room temperatures are used, substantially only isobutylene is absorbed.

It is an object of this invention to separate substantially pure isobutylene from an acid liquor obtained by contacting a mixture of hydrocarbons containing isobutylene with sulfuric acid of 55% to 75% concentration. This and other objects of the invention will be more readily understood on reading the following description of the process with reference to the accompanying drawing.

Referring to the drawing, a still is indicated by numeral 1, which still is heated by means (not shown), such as electrically or by means of gas or oil burners, or any other means whereby the heat input to the still may be regulated. The still is also provided with a draw-off line 2 arranged with valve 3, through which the spent acid is removed from the still to maintain a desired level. On the still is mounted a packed tower 4 which is insulated. At the bottom of the packed tower below the packed section is a collector plate 5 arranged with openings 6 and a draw-off line 7, provided with valve 8 through which samples may be taken. Heat is applied to the still causing water vapor to pass upwardly through the tower 4, through vapor line 13 to condenser 14 where it is condensed, returning to the tower by way of separator 15 and incorporator 11 where it is mixed with a reactive acid liquor feed. On reaching the tower, the dilute extract is stripped of its olefin.

The olefin passes out through vapor line 13, along with a small amount of alcohol and uncondensed steam through condenser 14 and separator 15 where most of the water and alcohol are separated and passed on to the incorporator 11 where they are mixed with more reactive acid liquor feed. The olefin is distilled through packed tower 17 wherein a reflux is maintained by allowing part of the olefin to condense after passing through lines 19 and 21 to condenser 22 and return to the packed tower. Meanwhile a side stream of pure olefin substantially free of alcohol and water is taken off through a line provided with valve 20 to suitable storage equipment.

The heat input to still 1 is regulated so as to generate sufficient steam to strip the extract in the tower of the olefin and allow enough steam to pass through to dilute the incoming reactive acid liquor. Samples are taken intermittently from the bottom of the tower through valve 8 and the heat to the still is regulated so as to maintain the acid concentration at this point at 45% to 50% and preferably 48% to 49%. The acid at this point is substantially hydrocarbon free and collects in the still where water is evaporated, bringing it back to its original strength. It is drawn off through line 2 and valve 3 and returned to the absorption process for the absorption of more olefin as it is of good color and of the original concentration.

Any acid strength suitable for the absorption of isobutylene may be used, so long as the water recycled through the system is sufficient to maintain the desired acid strength (45% to 50%) in the vicinity of plate 5.

The isobutylene is separated at about atmospheric pressure, though pressure slightly below or above atmospheric may be used, depending on the acid concentration.

The apparatus used may be modified in order that a part of the olefin may be condensed and refluxed to the upper part of the tower to maintain a more constant temperature. The acid liquor may also be prepared by dissolving an alcohol in sulfuric acid of 65% to 75% concentration.

In the following table, the effects of the acid concentrations on the yields of isobutylene are illustrated:

| | Per cent of isobutylene recovered on isobutylene charged | Per cent of polymers produced on isobutylene charged | Per cent of alcohol produced on isobutylene charged | Range of acid concentration in tower (per cent) |
|---|---|---|---|---|
| (1) | 94.4 | 2.5 | 3.1 | 48.0 to 49.5 |
| (2) | 92.8 | 1.6 | 3.9 | 45.0 to 49 |
| (3) | 92.5 | 0.7 | 6.8 | 45.0 to 48 |
| (4) | 90.0 | 3.5 | 4.4 | 45.0 to 47.5 |
| (5) | 89.0 | .2 | 7.1 | 46.0 to 48.5 |
| (6) | 88.4 | 6.4 | 3.8 | 47.0 to 49 |
| (7) | 88.4 | 6.4 | 3.8 | 42.5 to 49.6 |
| (8) | 85.4 | 0.8 | 5.0 | 38.0 to 48 |
| (9) | 81.8 | 8.42 | 5.34 | 47.7 to 50.5 |
| (10) | 78.0 | | 8.6 | 40.8 to 45.5 |
| (11) | 64.5 | 14.1 | 6.2 | 47.0 to 54.6 |
| (12) | 63.9 | 16.1 | 8.4 | 49.0 to 52.1 |

As the acid concentration above plate 5 is varied, the yields of isobutylene recovered are also varied, that is, as the acid concentration is raised more polymers are produced and less isobutylene regenerated, and as the acid concentration is reduced more alcohol is formed and less isobutylene regenerated. The critical range of acid concentration is 45% to 50% and maximum yields of isobutylene may be recovered when an acid concentration of 48% to 49% is maintained. When acid concentrations do not exceed 49%, the amount of polymer formed is less than 2% of the isobutylene content of the extract.

This invention is not to be limited to the particular apparatus that is described above, as other apparatus may be used, nor is it to be limited to any theories advanced as to the operation of the invention, but in the appended claims it is intended to claim all inherent novelty as broadly as the prior art permits.

The invention claimed is:

1. In the process of separating isobutylene from mixtures of hydrocarbons by forming an acid liquor by contacting a mixture of hydrocarbons containing isobutylene with sulfuric acid of 55% to 75% concentration, and diluting the said liquor to an acid strength of 45% to 50%, the steps in combination of stripping isobutylene from the acid liquor by passing the diluted acid liquor through a fractionating column countercurrent to a stream of superheated steam, passing the stripped acid liquor to a concentrating kettle connected to the fractionating column, concentrating the acid liquor in said kettle to produce therefrom said current of superheated steam, passing the separated isobutylene together with steam and undecomposed tertiary butyl alcohol through a condenser to condense the steam and the tertiary butyl alcohol, and returning the condensate to the fractionating tower together with a fresh supply of acid liquor containing isobutylene, whereby undecomposed tertiary butyl alcohol is returned directly to the fractionating tower.

2. In the process of separating isobutylene from mixtures of hydrocarbons by forming an acid liquor by contacting a mixture of hydrocarbons containing isobutylene with sulfuric acid of 55% to 75% concentration, and diluting the acid liquor to an acid strength of 45% to 50%, the steps in combination of separating isobutylene by passing the diluted acid liquor through a fractionating column countercurrent to a stream of superheated steam, passing the stripped acid liquor to a concentrating kettle connected to the fractionating column, concentrating the acid liquor in said kettle to produce said stream of superheated steam, passing the separated isobutylene, together with steam and undecomposed tertiary butyl alcohol, through a condenser to condense the steam and tertiary butyl alcohol, and returning the condensate to the fractionating tower together with a fresh supply of acid liquor containing isobutylene, whereby undecomposed tertiary alcohol is returned directly to the fractionating tower, discharging concentrated sulfuric acid from the concentrating kettle, dissolving further quantities of isobutylene in the concentrated acid and returning the acid liquor containing isobutylene to the fractionating column.

3. In an isobutylene recovery process, the steps in combination of treating an acid solution of isobutylene in a fractionating tower to separate therefrom isobutylene and tertiary butyl alcohol by the application thereto of superheated steam, discharging the stripped acid liquor to a concentrating kettle, simultaneously concentrating the acid liquor and producing superheated steam from said concentrating kettle to strip said acid solution in the fractionating tower, condensing water and tertiary butyl alcohol from the fractionating column to separate them from the isobutylene, mixing the condensed water and tertiary alcohol with the concentrated acid solution of isobutylene and returning the mixture to the fractionating column.

LEWIS A. BANNON.
HELMUTH G. SCHNEIDER.